July 21, 1970    KAZUTOMO IWATA ET AL    3,521,210
INTERMEDIATE FREQUENCY TRANSFORMER Filed May 13, 1958    3 Sheets-Sheet 1

INVENTORS
KAZUTOMO IWATA,
TATSUO MAEOKA,
BY Stevens, Davis, Miller & Mosher

ATTORNEYS

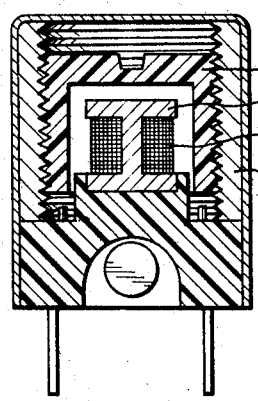
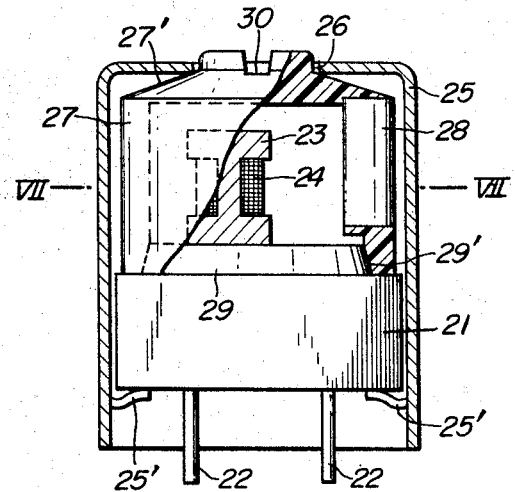
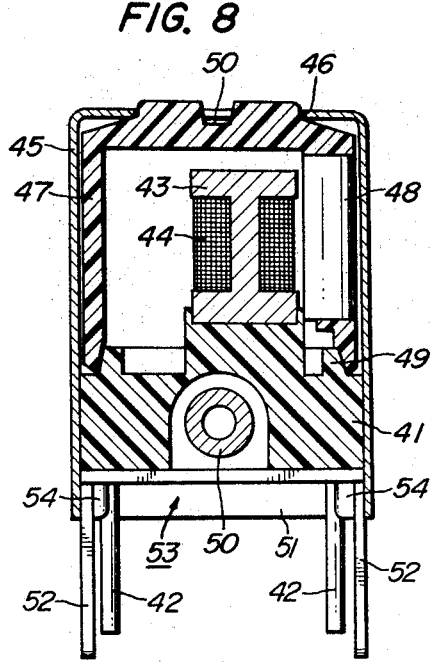
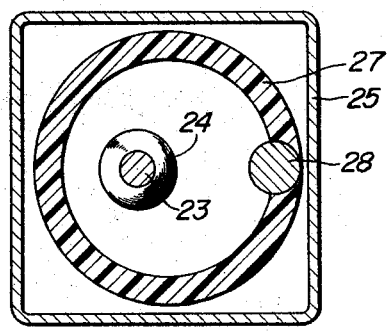
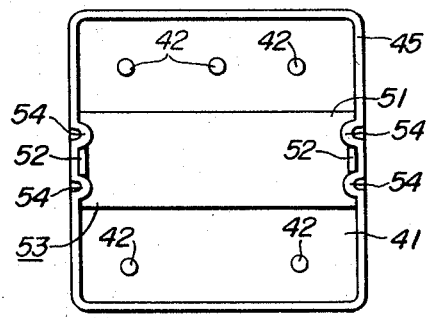

July 21, 1970  KAZUTOMO IWATA ET AL  3,521,210
INTERMEDIATE FREQUENCY TRANSFORMER Filed May 13, 1958  3 Sheets-Sheet 3

INVENTORS
KAZUTOMO IWATA,
TATSUO MAEOKA,

BY

ATTORNEYS

United States Patent Office 3,521,210
Patented July 21, 1970

3,521,210
INTERMEDIATE FREQUENCY TRANSFORMER
Kazutomo Iwata, Neyagawa-shi, and Tatsuo Maeoka, Kobe, Japan, assignors to Matsushita Electric Industrial Co., Ltd., Osaka, Japan, a corporation of Japan
Filed May 13, 1968, Ser. No. 728,558
Int. Cl. H01f 21/06
U.S. Cl. 336—87          6 Claims

ABSTRACT OF THE DISCLOSURE

Intermediate frequency transformers wherein a core having a coil wound thereon is fixed to a terminal board, a movable core associated with said core is provided in the outer peripheral portion of a support member having an adjusting portion exposed from the top surface of a shield casing, said movable core is adapted for two-dimensional movement, said support member is mounted in such a manner that the axis of rotation thereof is deviated from the center axis of said coil, and the distance between the movable core and the coil is changed through the rotation of the support member so that the inductance of the coil is varied accordingly.

BACKGROUND OF THE INVENTION

This invention relates to miniaturized intermediate frequency transformers which are suitable for use in radio receivers, television receivers and the like, and more particularly, it is directed to such transformers capable of being simplified in construction and manufactured very economically.

In the commonly employed intermediate frequency transformers, there are provided a drum type core having a coil wound thereon and a cap-like core which is fitted on the outer periphery of said drum core in such a manner as to cover said coil, as will be described later. The cap core is screwed to a separate support member and is displaced upwardly or downwardly along the support member by being rotated, so that the inductance of the coil may be varied in accordance with the displacement of the cap core. However, the use of such cap core makes it necessary to provide a separate support member and form screw threads in both the core and the support member. This causes difficulties in the manufacture of the transformer and makes it difficult to adjust the rotational torque acting between the core and the support member.

Among the conventional intermediate frequency transformers are three types, i.e., a first stage one, an interstage one and a detecting stage one, all of which are formed in the same configuration but they are slightly differentiated from each other in respect of characteristics. Therefore, it is necessary to exactly indicate the type of applications of such transformers. Thus, an attempt has conventionally been made to apply paint such as lacquer to the top of the cap core thereby indicating the type of application of the transformer. However, if such paint is applied to the top of the cap core, there will be a possibility that the paint thus applied could be scratched and removed by the fore edge of a screwdriver when adjustment is carried out by inserting the screwdriver in a recessed groove formed in the top surface of the cap core. Furthermore, the painting itself is very troublesome, and this constitutes a disadvantage from the standpoint of economy.

SUMMARY OF THE INVENTION

It is a primary object of this invention to eliminate the aforementioned drawbacks of the conventional intermediate frequency transformers.

It is an object of this invention to provide a novel improved intermediate frequency transformer, comprising a rotatable pot-shaped support member having a movable core provided in a side portion thereof, said support member being mounted in such a manner that it covers a coil and the axis of rotation thereof assumes a position deviated from the center axis of the coil, a terminal board provided with a guide, and a casing, said support member being supported by means of a through-aperture formed in the top surface of said casing and said guide.

Another object of this invention is to provide an intermediate frequency transformer, comprising a rotatable pot-shaped support member having a movable core provided in a side portion thereof, said support member being mounted in such a manner that it covers a coil and the axis of rotation thereof assumes a position deviated from the center axis of said coil, a terminal board provided with a guide, and a casing having bent pieces provided integrally in the opening portion thereof, wherein said support member is supported by means of a through-aperture formed in the top surface of said casing and said guide, and said bent pieces of the casing are pressed against the bottom surface of said terminal board so that the rotational torque imparted to said support member can be adjusted.

Still another object of this invention is to provide an intermediate frequency transformer, comprising a shield casing formed of aluminum, mounting legs formed of a solderable metal, and a support member provided with a movable core, wherein said mounting legs are tightened with respect to the lower end portion of the aluminum casing so that suitable stress is imparted to the support member, thereby making it possible to accurately control the rotation of the support member.

A further object of this invention is to provide an intermediate frequency transformer, wherein a resilient property is afforded to part of a support member carrying a movable core, and the movable core is made to escape outwardly by virtue of the resilient property when the core comes closest to a coil, thereby preventing damage of the core and coil, making it possible to control both the rotation of the support member and the occurrence of practical problems when the accuracy is deteriorated to some degree, and thus facilitating the manufacture of the transformer.

A still further object of this invention is to provide an intermediate frequency transformer, comprising a support member of a synthetic resin for supporting a movable core, said support member being directly colored to easily discriminate the type of application of the transformer.

Other objects, features and advantages of this invention will become apparent from the following description taken in conjunction with the accompanying drawings.

BRIEF DESCRIPTION OF THE DRAWINGS

FIG. 5 is a sectional side view of a conventional intermediate frequency transformer.

FIG. 6 is a side view, partly cutaway, of the intermediate frequency transformer according to a second embodiment of this invention.

FIG. 7 is a sectional view taken along line VII—VII of FIG. 6.

FIG. 8 is a sectional side view of the intermediate frequency transformer according to a third embodiment of this invention.

FIG. 9 is a bottom plan view of the transformer shown in FIG. 8.

DESCRIPTION OF THE PREFERRED EMBODIMENTS

Figure 1:
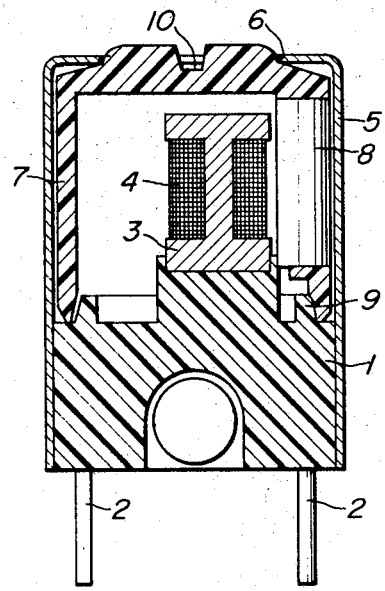
FIG. 1 is a sectional side view of the intermediate frequency transformer according to an embodiment of this invention.

Examples of the intermediate frequency transformer according to the present invention will now be described with reference to the drawings.

In FIGS. 1 to 4, the reference numeral 1 represents a terminal board having terminal pins 2 provided at predetermined positions. A drum core 3 having a coil 4 wound thereon is provided at a position slightly deviated from the center of the terminal board. The reference numeral 5 denotes a shield casing having a through-aperture 6 formed in the center of the top surface thereof. In the aperture 6 is fitted a pot-shaped support member 7 of a synthetic resin which was colored simultaneously with the molding thereof. A movable cylindrical core 8 is attached to the cylindrical portion of the pot-shaped support member 7, and a ring-shaped guide 9 is provided on the upper surface of the terminal board 1 so as to be disposed in engagement with the opening portion of the support member 7. In the top surface of the support member 7 is formed a recessed groove 10 to be engaged by a screwdriver.

The pot-shaped support member 7 is so mounted as to cover the coil 4 in such a manner that the axis of rotation of the support member 7 is slightly deviated from the center axis of the coil 4.

Furthermore, the support member 7 is provided on the top surface with a projection which projects out of the through-aperture 6, and the opening portion thereof is placed in engagement with the ring-shaped guide 9 provided on the upper surface of the terminal board 1 as described above. Thus, the support member 7 is elastically supported.

Figure 4B:
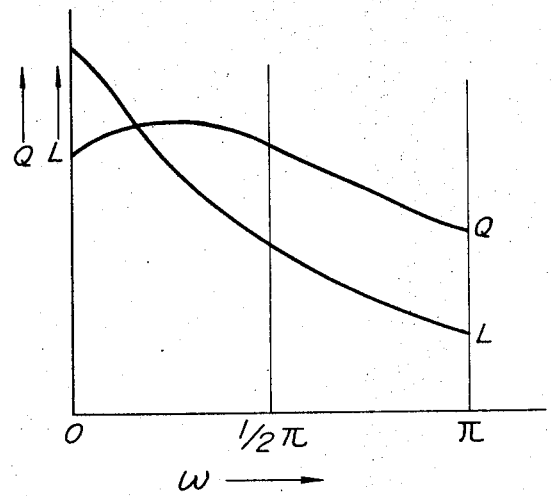
FIGS. 4a and 4b show the relationship between the coil and the movable core of said transformer and the characteristics thereof, respectively.
Figure 2:
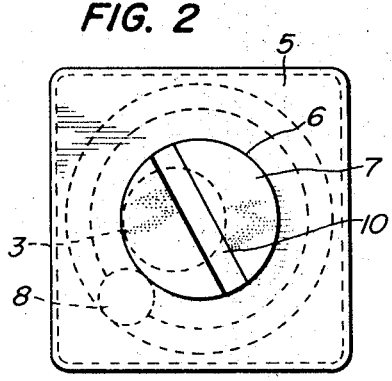
FIG. 2 is a top plan view thereof.
Figure 3:
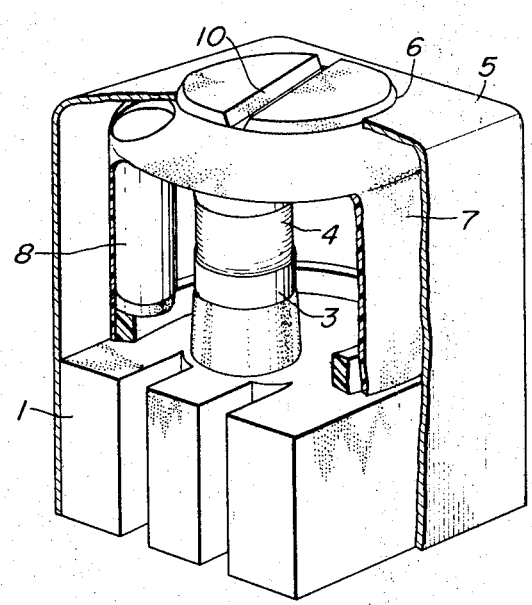
FIG. 3 is a perspective view, partly cutaway, of the transformer shown in FIG. 1.
Figure 4A:
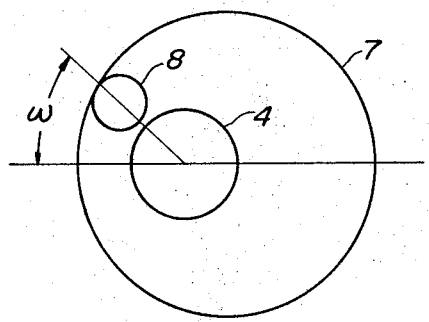

As will be appreciated from the foregoing, in the intermediate frequency transformer according to the present invention, the support member 7 configured in pot-like shape is supported by means of the through-aperture 6 formed in the center portion of the top surface of the casing and the ring-shaped guide 9 provided on the terminal board 1 in such a manner that the member 7 covers the core 3 having the coil 4 wound thereon and the axis of rotation of the member 7 is slightly deviated from the center axis of the coil 4, and the movable core 8 is attached to the cylindrical portion of the support member 7. Thus, the distance between the movable core 8 and the coil 4 is changed through the rotation of said support member 7, so that the inductance of the coil 4 is greatly varied. If $\omega$ is the angle between a straight line passing through the center of the coil 4 and the center of the support member 7 and a line passing through the center of the coil 4 and the center of the movable core 8, as shown in FIG. 4a, then the relationship between the angle $\omega$ and the inductance of the coil and that between the angle $\omega$ and Q of the coil are as shown in FIG. 4b. Furthermore, with the intermediate frequency transformer embodying the present invention, it is not necessary to form the movable core in cap-like shape and to provide screw threads in the outer periphery thereof. This greatly simplifies the formation of the movable core itself.

In accordance with the present invention, it is possible to mount the aforementioned pot-shaped support member in such a manner that it is deviated from the center axis of the coil merely by inserting the projection provided on the top portion of the support member in the through-aperture formed in the top surface of the shield casing and placing the opening portion of the member in engagement with the guide provided on the terminal board. Thus the manufacture, assembly and adjustment of the transformer can be facilitated remarkably.

FIG. 5 shows a conventional intermediate frequency transformer, including a drum core 12, a coil 11 wound on the core 12, a cap core 13 mounted in such a manner as to cover the coil 11, and a separate support member 14.

Description will now be made of a second embodiment of this invention with reference to FIGS. 6 and 7.

In FIGS. 6 and 7, the reference numeral 21 represents a terminal board provided with terminal pins 22, 23 a drum core which is mounted at a position slightly deviated from the center portion of the terminal board 21, 24 a coil wound on the outer periphery of the drum core 23, 25 a shield casing having an opening portion fitted on the outer periphery of the terminal board 21, 26 a bearing through-aperture formed in the center portion of the top surface of the shield casing 25, 27 a pot-shaped support member of a synthetic resin which was colored simultaneously with the molding thereof and which has a projection provided on the top portion which is tapered as indicated at 27′, the projection being inserted in the through-aperture 26, 28 a movable cylindrical core attached to the cylindrical portion of the support member 27, 29 a frusto-conical guide provided on the upper surface of the terminal board 21, the guide being tapered as indicated at 29′ and inserted in the opening portion of the pot-shaped support member 27, and 30 a recessed groove which is formed in the top surface of the support member 27 to be engaged by a screwdriver.

The support member 27 is mounted in such a manner that it covers the coil 4 and the axis of rotation thereof is slightly deviated from the center axis of the coil 24.

Further, the pot-shaped support member 27 is elastically supported by the fact that the projection provided on the top surface thereof is fitted in the through-aperture 26 and the opening portion thereof is engaged by the ring-shaped guide 29 provided on the top surface of the terminal board 21. At the opening portion of the shield casing 25 are integrally provided bent pieces 25′ which are pressed against the bottom surface of the terminal board 21. The rotational torque imparted to the support member 27 depends upon the compressing force of the pieces 25′.

In accordance with the present invention, it is possible to easily control the rotational torque imparted to the support member by virtue of the compressing force of the bent pieces 25′ provided on the opening portion of the casing 25. Thus, the manufacture, assembly and adjustment of the present intermediate frequency transformer can be greatly simplified. By suitably adjusting the compressing force of the bent pieces 25′, the tapered portion of the support member is brought into engagement with the through-aperture formed in the top surface of the shield casing so that the top portion of the latter is upwardly pushed, thus producing a rotational torque.

With reference to FIGS. 8 to 12, description will now be made of a third embodiment of the present invention. In the drawings, the reference numeral 41 represents a terminal board having terminal pins 42 provide at suitable positions, 43 a drum core which is mounted at a position slightly deviated from the center of the terminal board 41, 44 a coil wound on the drum core, 45 a fixed aluminum shield casing having the opening portion fitted on the outer periphery of the terminal board 41, 46 a bearing through-aperature formed in the top surface of the shield casing, 47 a pot-shaped support member of synthetic resin colored simultaneously with the molding thereof and having a projection provided on the top portion thereof, said projection being inserted in said through-aperture, a movable cylindrical core 48 attached to the cylindrical portion of the support member 47, 49 a ring-shaped guide provided on the upper surface of the terminal board 41, the guide being inserted in the opening portion of the pot-shaped support member 47, and 50 a recessed groove formed in the top surface of the support member 47 to be engaged by a screwdriver.

Figure 10:
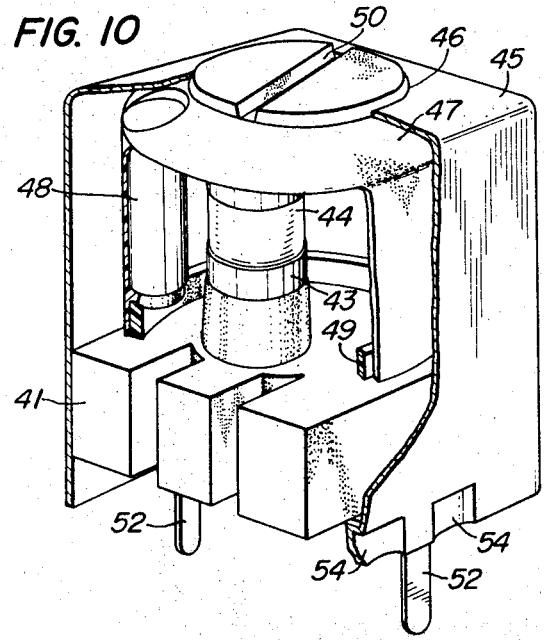
FIG. 10 is a perspective view, partly cutaway, of the transformer shown in FIG. 8.
Figure 11:
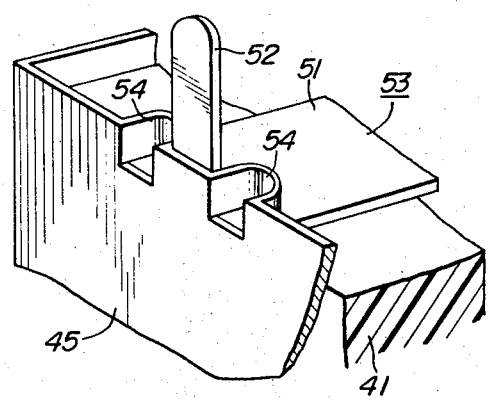
FIG. 11 is a fragmentary perspective view showing the main portion of the transformer shown in FIG. 8.

A grounding lug member 53 comprising a plate 51, having legs 52 provided on the opposite edge portions thereof is fixedly fitted onto retaining portions 54 formed in the lower end portions of the shield casing 45, as shown in FIGS. 10 and 11.

By pushing the terminal board 41 into the shield casing 45 to secure the attachment of the grounding lug member 53 in the retaining portions 54 of the casing 45, a stress is imparted to the pot-shaped support member 47 interposed between the terminal board 41 and the shield casing 45, so that the support member 47 can be completely prevented from being rotated even if a shock is imparted thereto.

Needless to say that the grounding lug member 53 is formed of a solderable metal such as brass for example.

Figure 12:
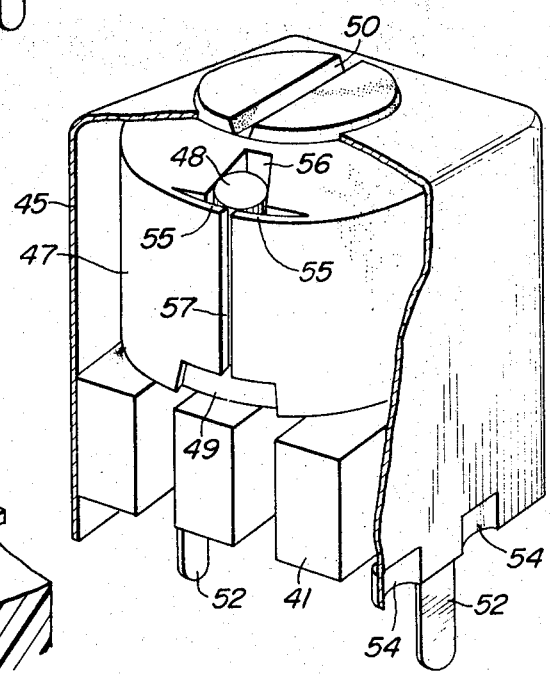
FIG. 12 is a partial perspective view of the intermediate frequency transformer shown in FIG. 8.

Referring to FIG. 12, thin plate portions 55 are formed in the periphery of the cylindrical portion of the support member 47 to define a longitudinal groove 57 therebetween, and the movable core 48 configured in the form of a cylinder is inserted between the thin plate portions 55 and a notched portion 56.

With the intermediate frequency transformer according to this invention, it is not necessary to configure the movable core in cap-like shape and forming screw threads on the outer periphery of the movable core itself can be greatly facilitated. Furthermore, since the movable core is elastically supported by the support member, it is possible to effectively prevent the core from being damaged if a great force is imparted to the mounting portion of the core due to the contact with the coil for example. Thus, the adjustment of the transformer can be effected reliably. In practice, no problem will arise if the coil is deviated to some degree from a predetermined position with respect to the support member. This means that the accuracy is not too critical so that the transformer can be manufactured easily and is also economically advantageous Moreover, in accordance with the present invention, the support member configured in the form of a pot can be mounted while being deviated from the center axis of the coil merely by fitting the projection provided on the top of the support member in the through-aperture formed in the top surface of the shield casing 45 and placing the opening portion of the support member in engagement with the guide provided on the terminal board. Furthermore, it is possible to increase the mounting strength of the legs provided on the mount by tightening the latter, so that the support member can be retained stably. This greatly simplifies the manufacture, assembly and adjustment of the transformer.

What is claimed is:

1. An intermediate frequency transformer, comprising a rotatable support member provided with a core and a fixed drum type core having a coil wound thereon, said support member being mounted in such a manner that the axis of rotation of the support member is deviated from the center axis of drum type core so that the distance between the drum type core and the core is changed by two-dimensionally rotating said support member whereby the inductance of the coil is changed.

2. An intermediate frequency transformer according to claim 1, further comprising a shield casing enclosing said transformer and having one end open, said support member being configured in the form of a pot and provided with said core in the cylindrical portion thereof, a projection provided at the top of the support member, a bearing through-aperture formed in a center portion of the top surface of said shield casing, a terminal board closing said open end of the shield and having a ring-shaped guide provided for engagement with said support member.

3. An intermediate frequency transformer according to claim 1, wherein the support member is formed of a synthetic resin colored simultaneously with the molding thereof.

4. An intermediate frequency transformer according to claim 1, wherein said support member further comprises thin plate portions formed in the outer periphery of the cylindrical portion thereof which define a longitudinal groove therebetween and a notched portion formed in the neighborhood of the thin plate portions, and said core being elastically retained between the thin plate portions and the notched portion.

5. An intermediate frequency transformer according to claim 2, wherein said shield casing is made of aluminum and further comprises a grounding lug member formed of a solderable metal, said grounding lug member being tightly fitted in the open end portion of the shield casing to thereby push the terminal board upwardly.

6. An intermediate frequency transformer according to claim 2, wherein bent pieces are provided in the open end of the shield casing, said bent pieces being pressed against the lower surface of the terminal board so that the support member is elastically supported by the compressing force of the bent pieces.

References Cited

UNITED STATES PATENTS

| | | | |
|---|---|---|---|
| 2,823,359 | 2/1958 | Wentworth | 336—135 XR |
| 2,836,804 | 5/1958 | Glover et al. | 336—135 |
| 2,883,633 | 4/1959 | Jamieson | 336—135 XR |
| 2,935,707 | 5/1960 | Abbot | 336—135 |
| 3,135,937 | 6/1964 | Habsburg | 336—87 XR |

FOREIGN PATENTS

| | | |
|---|---|---|
| 1,081,832 | 6/1954 | France. |
| 1,175,255 | 11/1958 | France. |
| 910,942 | 5/1954 | Germany. |

THOMAS J. KOZMA, Primary Examiner

U.S. Cl. X.R.

336—92, 132, 135